US012811856B2

(12) United States Patent
Odoom et al.

(10) Patent No.: US 12,811,856 B2
(45) Date of Patent: Nov. 24, 2026

(54) NETWORK SWITCHING OF OPERATING VIRTUAL MACHINES

(71) Applicant: Microsoft Technology Licensing, LLC, Redmond, WA (US)

(72) Inventors: Eric Odoom, Seattle, WA (US); Santhana Gopalan Raghavan, Seattle, WA (US); Ashish Bhargava, Sammamish, WA (US); Sumeet Mittal, Woodinville, WA (US); Vladimir Serov, Woodinville, WA (US); Xiudong Fei, Bellevue, WA (US); Xinyan Zan, Clyde Hill, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 14 days.

(21) Appl. No.: 18/756,630

(22) Filed: Jun. 27, 2024

(65) Prior Publication Data

US 2026/0005923 A1 Jan. 1, 2026

(51) Int. Cl.

*H04L 41/0895* (2022.01)
*H04L 41/12* (2022.01)
*H04L 61/5007* (2022.01)

(52) U.S. Cl.

CPC .......... *H04L 41/0895* (2022.05); *H04L 41/12* (2013.01); *H04L 61/5007* (2022.05)

(58) Field of Classification Search

CPC ............................ H04L 41/0895; H04L 41/12
See application file for complete search history.

(56) References Cited

U.S. PATENT DOCUMENTS

2009/0278620 A1* 11/2009 Taghivand ................ H03L 7/10 331/36 C
2019/0146823 A1* 5/2019 Rewaskar ............. G06F 9/4406 718/1
2019/0278620 A1 9/2019 Korbar et al.
2020/0218558 A1 7/2020 Ellore Sreenath et al.
2022/0052877 A1 2/2022 Singh et al.

OTHER PUBLICATIONS

International Search Report and Written Opinion received for PCT Application No. PCT/US2025/020791, (MS#500963-PCT01) mailed on Jul. 18, 2025, 15 pages.

* cited by examiner

*Primary Examiner* — Umar Cheema
(74) *Attorney, Agent, or Firm* — Holzer Patel Drennan

(57) ABSTRACT

A cloud computing resource system may receive an allocation request to connect the virtual machine to a customer network, wherein the virtual machine is executing while the allocation request is received and the allocation request includes network configuration information of the customer network. A cloud computing resource system may detect a discovery request from the virtual machine triggered by receipt of the allocation request, wherein the virtual machine remains executing during detection of the discovery request. A cloud computing resource system may update, responsive to detecting the discovery request from the virtual machine, a virtual network interface controller of the virtual machine with the network configuration information of the customer network, wherein the virtual machine remains executing during updating of the network configuration information.

20 Claims, 6 Drawing Sheets

NETWORK SWITCHING OF OPERATING VIRTUAL MACHINES

BACKGROUND

Cloud computing resource systems, which are also called "cloud computing environments," "cloud computing networks," "distributed computing systems," or simply the "cloud," typically provide computing, networking, and storage resources and services on demand from virtual machines (VMs) over a wide-area network, such as the Internet. The resources of the cloud computing resource systems are generally available on demand from shared pools of configurable computing resources such as networks, servers, storage devices, applications, and software services. Some cloud computing resource systems employ computing instances that are injected into a customer's virtual network using a dedicated data plane to isolate data from that of other customers.

SUMMARY

In some aspects, the techniques described herein relate to a method for modifying a network connectivity of a virtual machine, the method including: receiving an allocation request to connect the virtual machine to a customer network, wherein the virtual machine is executing while the allocation request is received and the allocation request includes network configuration information of the customer network; detecting a discovery request from the virtual machine triggered by receipt of the allocation request, wherein the virtual machine remains executing during detection of the discovery request; and updating, responsive to detecting the discovery request from the virtual machine, a virtual network interface controller of the virtual machine with the network configuration information of the customer network, wherein the virtual machine remains executing during updating of the network configuration information.

In some aspects, the techniques described herein relate to a computing system for modifying a network connectivity of a virtual machine operating on the computing system, the computing system including: one or more hardware processors; a communication interface executable by the one or more hardware processors and configured to receive an allocation request to connect the virtual machine to a customer network, wherein the virtual machine is executing while the allocation request is received and the allocation request includes network configuration information of the customer network; and a virtual network agent executable by the one or more hardware processors and configured to detecting a discovery request from the virtual machine triggered by receipt of the allocation request, wherein the virtual machine remains executing during detection of the discovery request, the virtual network agent further configured to update, responsive to detecting the discovery request from the virtual machine, a virtual network interface controller of the virtual machine with the network configuration information of the customer network, wherein the virtual machine remains executing during updating of the network configuration information.

In some aspects, the techniques described herein relate to one or more tangible processor-readable storage media embodied with instructions for executing on one or more processors and circuits of a computing device a process for modifying a network connectivity of a virtual machine, the process including: receiving an allocation request to connect the virtual machine to a customer network, wherein the virtual machine is executing while the allocation request is received and the allocation request includes network configuration information of the customer network; issuing an allocation change event responsive to receipt of the allocation request, wherein the virtual machine remains executing during issuance of the allocation change event; detecting, responsive to issuing the allocation change event, a discovery request from the virtual machine triggered by receipt of the allocation request, wherein the virtual machine remains executing during detection of the discovery request; and updating, responsive to detecting the discovery request from the virtual machine, a virtual network interface controller of the virtual machine with the network configuration information of the customer network, wherein the virtual machine remains executing during updating of the network configuration information.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

To perform certain network update operations (e.g., updating a Private IP address of a network interface within the same virtual network address space or switching a subnetwork reference on the network interface from one subnetwork to another within the same virtual network) conventional cloud computing resources systems first need to shut down the VM, reconfigure the network settings of the VM, and then relaunch the VM. To connect an existing VM from one customer's network to another customer's network, conventional cloud computing resource systems delete the VM and create a new VM that is configured for the new customer's network. In other words, conventional cloud computing resource systems are unable to directly switch the virtual network of a VM from one customer to another. Such conventional methods for reconfiguring the network connectivity settings of the VM result in reduced available computing resources during downtime while the network settings are reconfigured. Additional latencies for shutting down the VM and for relaunching the VM, or latencies for deleting the VM and creating a new VM configured for the new customer's network, also result from the network reconfiguration.

The technology described herein addresses the deficiencies of conventional approaches to reconfiguring the network connectivity of VMs described above. The described technology involves a host operating system of a cloud computing resource system reconfiguring the network connectivity of a VM, generating an event indicating that the network connectivity has been reconfigured. The guest OS of the VM, which is subscribed to the event, performs a dynamic host configuration protocol ("DHCP") request to discover its IP address upon detecting the event generated by the host OS. The described modifies the network connectivity of an operating VM regarding customer networks without having to shut down the VM or having to delete the VM and create a new VM. Accordingly, the technology described herein can eliminate the latencies resulting from shutting down, reconfiguring, and restarting the VM, or resulting from deleting the VM and creating a new VM, that occur from using the conventional approaches to modifying the network connectivity of the VM. Consequently, by reducing the latencies compared to conventional approaches, the technology described herein increases the availability of computing resources to customers.

Figure 1:
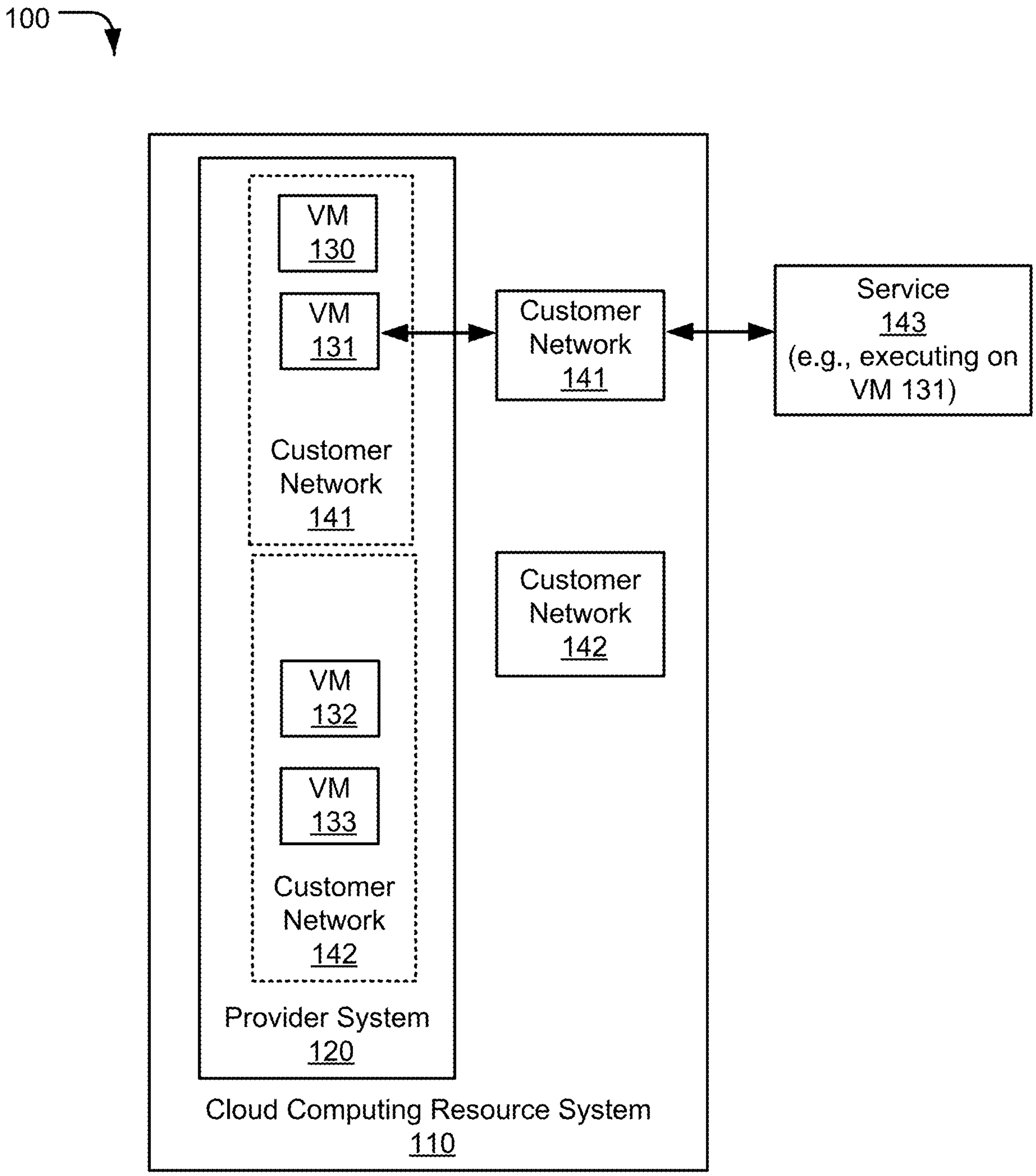
FIG. 1 illustrates an example computing environment that includes a cloud computing resource system for enabling a provider system to modify the network connectivity of a VM from a first customer network to a second customer network.

FIG. 1 illustrates an example computing environment 100 that includes a cloud computing resource system 110 for enabling a provider system 120 to modify the network connectivity of a VM from a first customer network to a second customer network.

The cloud computing resource system 110 provides computing, networking, and storage resources and services on demand to providers (e.g., provider system 120) that use the resources to provide services to customers (e.g., customer network 141, customer network 142). The cloud computing resource system 110 provides hardware to support VMs (e.g., VM 130, VM 131, VM 132, VM 133) over a wide-area network, such as the Internet. The resources provided by the cloud computing resource system 110 may be available on demand from shared pools of configurable computing resources such as networks, servers, storage devices, applications, and software services. For example, a VM is executed on one or more computing devices of the cloud computing resource system 110. For example, the VM may be executed on a single computing device or may be distributed over multiple computing devices.

The provider system 120 has access, within the cloud computing resource system 110, to VMs (e.g., VM 130, VM 131, VM 132, VM 133) that are supported by the cloud computing resource system 110, and the provider system 120 allocates the VMs among one or more customer networks (e.g., customer network 141, customer network 142). The provider system 120 may buy/rent one or more VMs from the cloud computing resource system 110 and allocate the one or more VMs to provide services to one or more customer networks (e.g., customer network 141, customer network 142). In the example illustrated in FIG. 1, as shown with dashed lines, the provider system 120 allocates VM 130 and VM 131 to customer network 141 and allocates VM 132 and VM 133 to customer network 142. For example, allocating a VM involves configuring the network connectivity settings of the VM to communicate with the respective customer network to which the VM is allocated so that the customer networks can access a service 143 that executes on a VM. For example, the VM 131, which is allocated to customer network 141, communicates with the customer network 141. A service 143 executing on the VM 131 is accessible from one or more systems in network communication with the customer network 141 of the cloud computing resource system 110. For example, a user computing device or other computing device communicates with the customer network 141 to access the service 143 executing on the VM 131 supported by one or more computing devices of the cloud computing resource system 110.

Within the computing environment 100, the general functionality of the cloud computing resource system 110, the provider system 120, the customer networks (e.g., customer network 141, customer network 142), the VMs (e.g., VM 130, VM 131, VM 132, VM 133), and the service 143 is the same or similar to that described with respect to like-named components of other figures herein.

Figure 2:
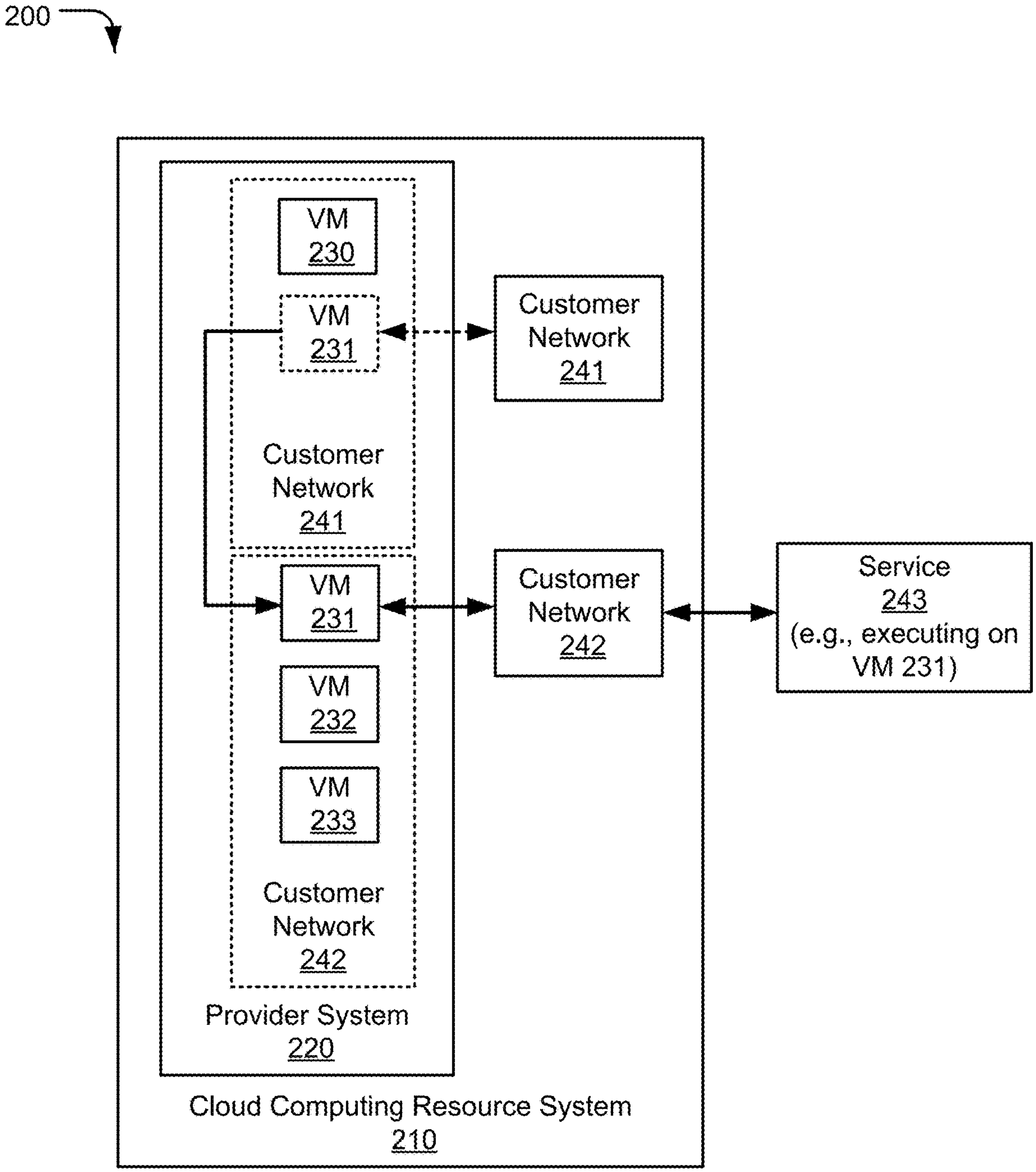
FIG. 2 depicts an example computing environment that includes a cloud computing resource system for enabling a provider system to modify the connectivity of a VM from a first customer network to a second customer network.

FIG. 2 depicts an example computing environment 200 that includes a cloud computing resource system 210 for enabling a provider system 220 to modify the connectivity of a VM from a first customer network to a second customer network. Within the computing environment 200, the general functionality of the cloud computing resource system 210, the provider system 220, the customer networks (e.g., customer network 241, customer network 242), the VMs (e.g., VM 230, VM 231, VM 232, VM 233), and the service 243 is the same or similar to that described with respect to like-named components of other figures herein.

The cloud computing resource system 210 provides hardware to support VMs (e.g., VM 230, VM 231, VM 232, VM 233) over a wide-area network, such as the Internet. The provider system 220 has access, within the cloud computing resource system, 210, to VMs (e.g., VM 230, VM 231, VM 232, VM 233) that are supported by the cloud computing resource system 210, and the provider system 220 allocates the VMs among one or more customer networks (e.g., customer network 241, customer network 242). In the example illustrated in FIG. 2, the provider system 220 initially allocates VM 230 and VM 231 to customer network 241 and initially allocates VM 232 and VM 233 to customer network 242. As indicated in FIG. 2 with dashed arrows, the VM 231, which is initially allocated to customer network 241, initially communicates with the customer network 241. In some implementations, a service executing on the VM 231 is accessible from one or more systems in network communication with the customer network 241 of the cloud computing resource system 210 while the VM 231 is initially allocated to customer network 241.

As depicted in FIG. 2, the provider system 220 reallocates VM 231 from customer network 241 to customer network 242. For example, the customer network 241 may be associated with Merchant A, the customer network 242 may be associated with Merchant B, and the VMs (VM 230, VM 231, VM 232, VM 233) provide payment processing services for Merchant A and Merchant B. The provider system 120 detects that VM 232 and VM 233 have received increased requests from Merchant B due to increased online shopping traffic at Merchant B (e.g., Merchant B is having an online sale). The provider system 120 determines that reallocating VM 231 from customer network 241 to customer network 242 would satisfy the increased processing demand of Merchant B while still being able to satisfy the processing demand of Merchant A with the remaining VM 230. The provider system 220 reallocates VM 231 from customer network 241 to customer network 242 while VM 231 is operating, without shutting down VM 231. In some implementations, requests inbound from customer network 241 after VM 231 is reallocated to customer network 242 are dropped.

For example, the host operating system of the cloud computing resource system 210 modifies network connectivity settings associated with the VM 231 to include the IP address of the customer network 242 and generates an event indicating that the network connectivity of VM 231 has been reconfigured. The guest operating system (GOS) of the VM 231, which is subscribed to the event, generates a DHCP request to discover the IP address of the customer network 242 upon detecting the event generated by the host operating system (HOS). The VM 231 then transmits a request to its supporting VNIC to reconfigure the network settings of the VNIC to enable communication between the VM 231 and the customer network 242 of Merchant B. Upon the network settings of the VNIC of VM 231 being changed to enable communication between the VM 231 and the customer network 242, the VM 231 can communicate with the customer network 242, as depicted in FIG. 2 with solid arrows. In some implementations, user computing devices or other computing devices may communicate with the customer network 242 to access a service 243 executing on the VM 231 supported by one or more computing devices of the cloud computing resource system 110.

Figure 3:
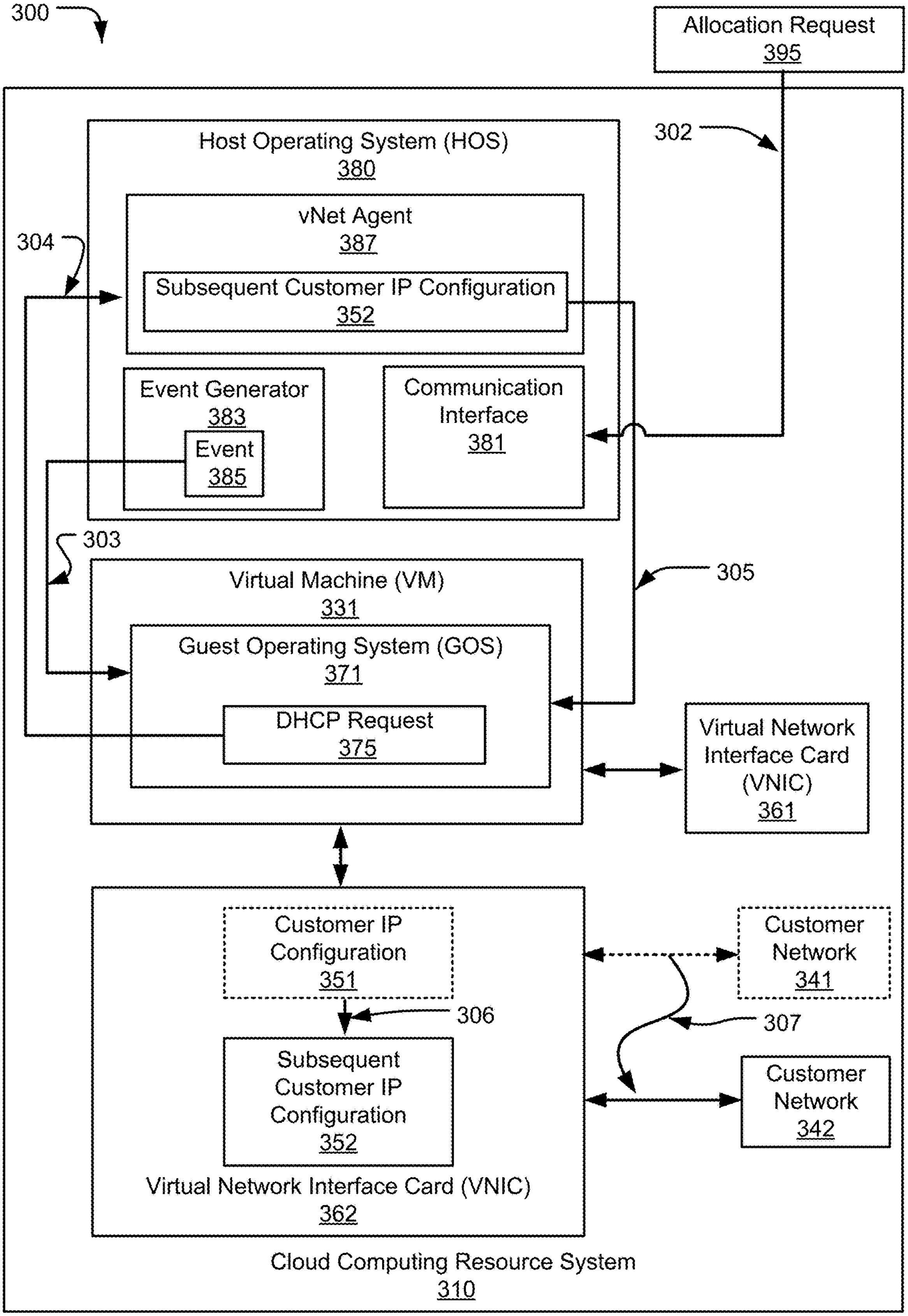
FIG. 3 depicts an example computing environment for modifying, by a cloud computing resource system, the network connectivity of a VM from a first customer network to a second customer network by updating network connectivity settings of a virtual network interface controller (VNIC) that supports the VM.

FIG. 3 depicts an example computing environment 300 for modifying, by a cloud computing resource system 310, the network connectivity of a VM 331 from a first customer network to a second customer network by updating network connectivity settings of a virtual network interface controller (VNIC) 362 that supports the VM 331. The example computing environment 300 includes a cloud computing resource system 310, a customer network 341, a customer network 342, a VM 331 that includes a guest operating system (GOS) 371, a VNIC 361, a VNIC 362, and a host operating system (HOS) 380 that includes a virtual network (vNet) agent 387, an event generator 383, and a communication interface 381. Within the computing environment 300, the general functionality of the cloud computing resource system 310, the VM 331, the customer networks (e.g., customer network 341, customer network 342), and the VNICs (e.g., VNIC 361, VNIC 362) is the same or similar to that described with respect to like-named components of other figures herein.

The VNICs (e.g., VNIC 361, VNIC 362) provide an interconnection between a VM and a network. In some implementations, the VM 331 is configured to have a primary VNIC (e.g., the VNIC 361) and a secondary VNIC (e.g., the VNIC 362), where the primary VNIC enables the VM 331 to communicate with a customer network and the secondary VNIC enables the VM to communicate with a subnetwork or other resource of the provider system network. In some implementations, the VNICs are virtual VNICs (VNICs). In some implementations, each VNIC (e.g., the VNIC 361, the VNIC 362) has network configuration information (e.g., customer IP configuration 351 information, subsequent customer IP configuration 352 information) describing one or more of the subnet that the VNIC is mapped to, the VM the VNIC is attached to, the private IP address of the VNIC, and other network connectivity information. Accordingly, an update to the VNIC updates the computing resource (e.g., the VM 331 attached to the VNIC 362) it is attached to.

In the example depicted in FIG. 3, the VM 331 is communicatively coupled to a first VNIC 361 that enables the VM 331 to communicate with a provider network of the provider system 120 and to a second VNIC 362 that enables the VM 331 to communicate with a customer network 341. For example, the VNIC 361 is configured with IP configuration information that includes an IP address of the provider network. The VNIC 362 is configured with customer IP configuration 351 information that includes an IP address of the customer network 341. For example, the customer IP configuration 351 information includes information on the IP address, the VM 331, and the virtual network. Together, they enable connectivity on the VM 331 through the VNIC 362 on the referenced virtual network. In some implementations, the VNIC 361 only enables communication with networks or subnetworks of the provider system while the VNIC 362 is configurable/reconfigurable for communication with various customer networks (e.g., customer network 341, customer network 342). For example, a security policy or other rule of the provider system limits which VNIC(s) can support communication of a VM with a customer network. For example, the security policy prohibits multiple separate customer networks from having access to the same VM. In other implementations, more than one VNIC (e.g., both VNIC 362 and VNIC 361) are configurable/reconfigurable for communication with separate customer networks (e.g., the VNIC 362 enables communication of the VM 331 with customer network 342 and the VNIC 361 enables communication of the VM 331 with customer network 341).

The host operating system (HOS) 380 of the cloud computing resource system receives, at operation 302, an allocation request 395 to reallocate VM 331 from customer network 341 to customer network 342. For example, the HOS 380 receives the request from the provider system at a request interface 381 of the HOS 380. The allocation request 395 includes an IP address of the customer network 342. Responsive to receiving the allocation request 395, the HOS 380 generates, using the event generator 383, an event 385. The event 385 indicates that the network connectivity of VM 331 has been reconfigured. The guest operating system (GOS) 371 of the VM 331 detects the event 385 at operation 303. For example, the GOS 371 is subscribed to the event 385 and detects the issuance of the event 385. For example, the VM 331 checks for events once during boot up and whenever the event 385 is sent to the GOS 371 from that moment onwards.

The GOS 371 generates, at operation 304, a dynamic host configuration protocol (DHCP) request 375 to discover the IP address of the customer network 342 upon detecting the event 385 generated by the HOS 380. For example, DHCP is a client-server protocol in which servers (e.g., the HOS 380) manage a pool of unique IP addresses and information about client configuration parameters. The servers then assign addresses out of those address pools. DHCP-enabled clients (e.g., the VM 331) send a request to the DHCP server (e.g., the HOS 380) whenever they connect to a network. Clients configured with DHCP (e.g., the VM 331) broadcast a request to the DHCP server (e.g., the HOS 380) and request network configuration information. The HOS 380 responds to the DHCP request by providing, at operation 305, the subsequent customer IP configuration 352 information previously specified by the provider system. In some implementations, the provider system specifies a specific VNIC of the VM 331 to be updated with the subsequent customer IP configuration 352 information.

Upon discovering the subsequent customer IP configuration 352 information associated with the customer network 342 via the response to the DHCP request received from the HOS 380, the VM 331 then transmits a request to the VNIC 362 to reconfigure the network settings of the VNIC 362 based on the subsequent customer IP configuration 352 information. At operation 306, the VNIC 362 reconfigures its network settings based on the subsequent customer IP configuration 352 to enable communication between the VM 331 and the customer network 342 and to disable communication between the VM 331 and the customer network 341. Upon the network settings of the VNIC 362 of VM 331 being changed from customer IP configuration 351 information to the subsequent customer IP configuration 352 information, the VM 331 communicates with the customer network 342 instead of customer network 341, as depicted in FIG. 3 at operation 307. In some implementations, user computing devices or other computing devices may communicate with the customer network 342 to access a service executing on the VM 331 supported by one or more computing devices of the cloud computing resource system 310.

Figure 4:
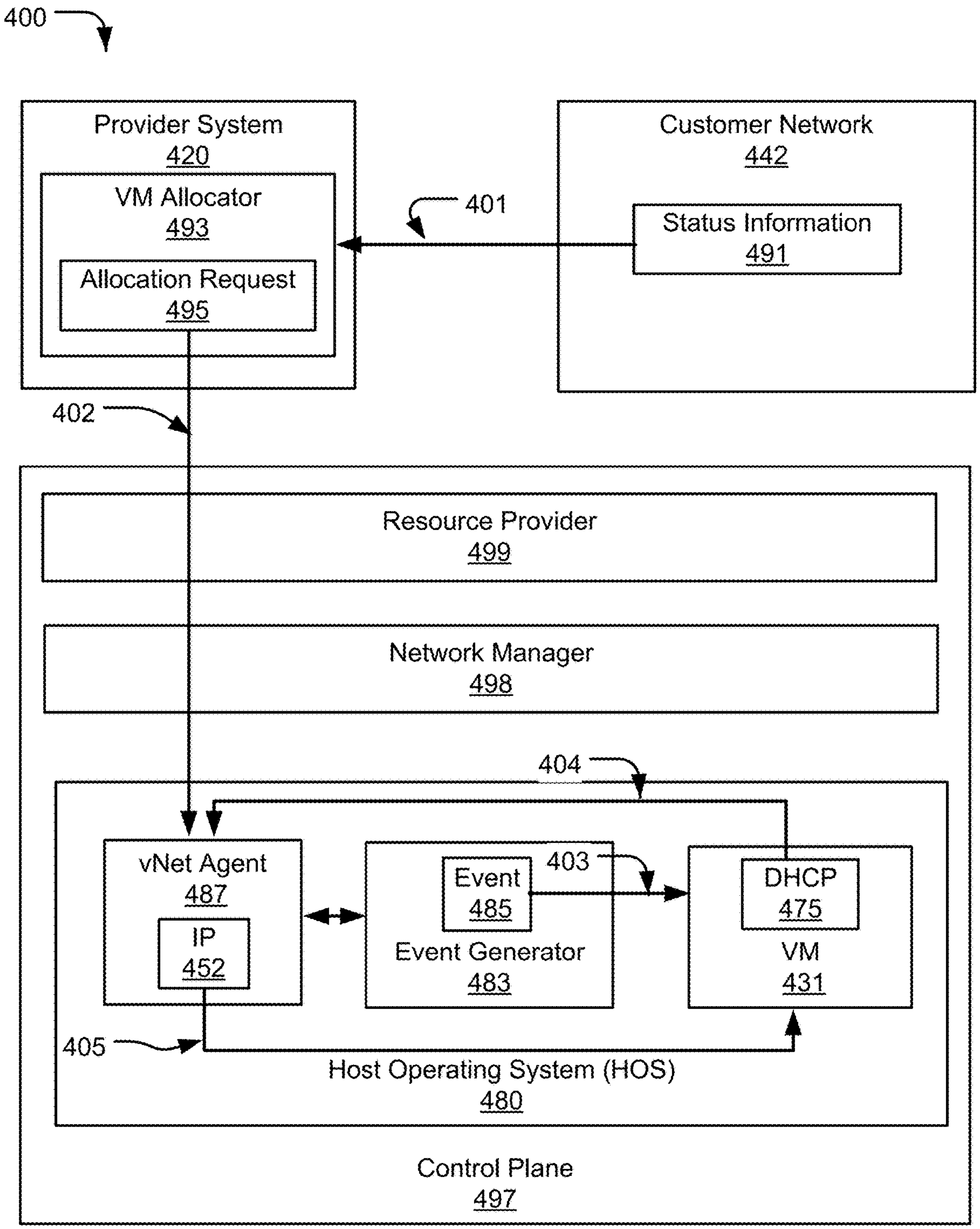
FIG. 4 depicts an example computing environment for modifying, by a cloud computing resource system, the network connectivity of a VM from a first customer network to a second customer network via generating an event and responding to a DHCP request.

FIG. 4 depicts an example computing environment 400 for modifying, by a cloud computing resource system 410, the network connectivity of a VM 431 from a first customer network to a second customer network via generating an event 485 and responding to a DHCP 475 request. The example computing environment 400 includes a customer network 442, a provider system 420 that includes a VM allocator 493, and a control plane 497 including a host operating system (HOS) 480, network manager 498, and a resource provider 499. The HOS 480 includes a vNet agent 487, an event generator 483, and the VM 431. The customer network 442, provider system 420, and control plane 497 and their respective subcomponents/subsystems operate within a cloud computing resource system. Within the computing environment 400, the general functionality of the cloud computing resource system 410, the HOS 480 (including the vNet agent 487, the event generator 483, and the VM 431), the provider system 420, the customer network 442, the control plane 497, the network manager 498, and the resource provider 499 is the same or similar to that described with respect to like-named components of other figures herein.

At operation 401, the provider system 420 receives status information 491 from the customer network 442. In some implementations, the provider system 420 receives the status information 491 from the VM 431. The status information 491 may include a volume of requests transmitted by the customer network 442 to one or more VMs including the VM 431 over one or more periods (e.g., one or more historical time periods and/or one or more future time period estimates). The status information 491 may include a volume of requests processed by the VM 431 over one or more time periods (e.g., one or more historical time periods and/or one or more future time period estimates).

Based on the status information 491, a VM allocator 493 of the provider system 420 transmits, at operation 402, an allocation request 495 to the vNet Agent of the HOS 480 via the resource provider 499 and the network manager 498 of the control plane 497. For example, the VM allocator 493 determines, from the status information 491, a processing demand of the customer network 442 and compares the processing demand to the processing capacity of a set of one or more VMs currently allocated to the customer network 442 and determines that the processing demand is greater than the processing capacity. For example, the customer network 442 needs 5000 requests processed within the next 10 minutes and the current processing capacity of VMs allocated to the customer network 442 is 4000 requests within the next 10 minutes. The VM 431 is not currently allocated to the customer network 442 and the VM allocator 493 determines that allocating the VM 431 will increase the processing capacity to greater than 5000 requests within the next 10 minutes. Accordingly, the VM allocator 493 transmits the allocation request 495 to the vNet agent 487 requesting to allocate the VM 431 to the customer network 442. In some implementations, the cloud computing resource system performs one or more functions described herein as being performed by the VM allocator 493, for example, determining processing demand/capacity of customer networks and determining VM(s) to be reallocated among customer networks. In some implementations, the VM allocator 493 receives input from an operator of the provider system to update the network configuration settings of a specific VM (e.g., VM 431) to allocate the VM 431 to the customer network 442 and transmits the allocation request 495 responsive to receiving the input. In some scenarios, the VM 431 is not allocated to any customer network before issuance of the allocation request 495. In some scenarios, the VM 431 is allocated to a customer network other than the customer network 442 before issuance of the allocation request 495.

In some implementations, the provider can create a VM using the VM allocator 493. For example, the provider system creates a VM having two VNICs, with the first VNIC (e.g., a management VNIC) referencing a subnetwork of a management system, owned, and controlled by the provider system and the second VNIC including IP configuration information referencing a customer's subnetwork. With this network architecture, the customer's data path and the management plane data path are de-coupled In some implementations, the provider system can add network security groups (NSGs) to one or more of the first VNIC and the second VNIC and to the management subnetwork because they are owned and hosted in the provider's subscription. The customer, in these implementations, can add NSG rules on the subnetwork (e.g., the customer network 341, the customer network 342) owned by the customer. In some implementations, the second VNIC has NSGs including net deny rules that are a union of deny rules configured on the second VNIC and the deny rules configured on the customer's subnetwork. In these implementations, the management (first) VNIC is under the control of the provider system and will continue to provide connectivity regardless of the actions taken by the end customer.

The control plane 497 includes the resource provider 499, the network manager 498, and the HOS 480. The resource provider 499 determines a cluster of VMs to which the VM 331 identified in the allocation request 495 belongs. The network manager 498 (e.g., a cluster manager) is associated with the determined cluster and the network manager 498 identifies the HOS 480 of the VM 431. The vNet agent 487 operates on the HOS 480 and manages the HOS 480. In some implementations, the provider system can switch the secondary VNIC 462 to connect to a VM (e.g., VM 431 or other VM) of a customer's subscription, creating an injected VNIC scenario. The injected VNIC 462 (secondary VNIC) enables a provider system to inject compute instances into an existing VNet, creating a multi-homing configuration in which a data plane uses a dedicated network interface (e.g., secondary VNIC 462) to connect the customer's VNet, while another dedicated network interface (e.g., primary VNIC 461) provides management plane connectivity to the provider system. Such multi-VNet homing advantageously provides data plane isolation for the provider system's VNet to comply with applicable security policies without disrupting management traffic between the injected resources and the provider system.

The vNet agent receives the allocation request 495 to allocate (or to reallocate) VM 431 to the customer network 442. For example, the HOS 480 receives the request from the provider system at the vNet agent 487 of the HOS 480. The allocation request 495 includes an IP 452 address of the customer network 442. Responsive to receiving the allocation request 495, the HOS 480 generates, using the event generator 483, an event 485. The event 485 indicates that the network connectivity of VM 431 has been reconfigured. The vNet agent 487 associates the IP 452 address of the customer network 442 with the VM 431 and the event 485 and stores the IP 452 address.

The VM 431 (e.g., the GOS of the VM 331) detects the event 385 at operation 403. For example, the VM 431 is subscribed to the event 485 and detects the issuance of the event 485. Responsive to detecting the event 485 generated by the HOS 480, the VM 431 transmits to the vNet agent 487 at operation 404, a DHCP 475 request to discover the IP address of the customer network 442. At operation 405, the vNet agent 487 responds to the DHCP request by providing the IP 452 address of the customer network 442 to the VM 431. The VM 431 then communicates with a VNIC to reconfigure the network settings of the VNIC so that it communicates with the customer network 442.

Figure 5:
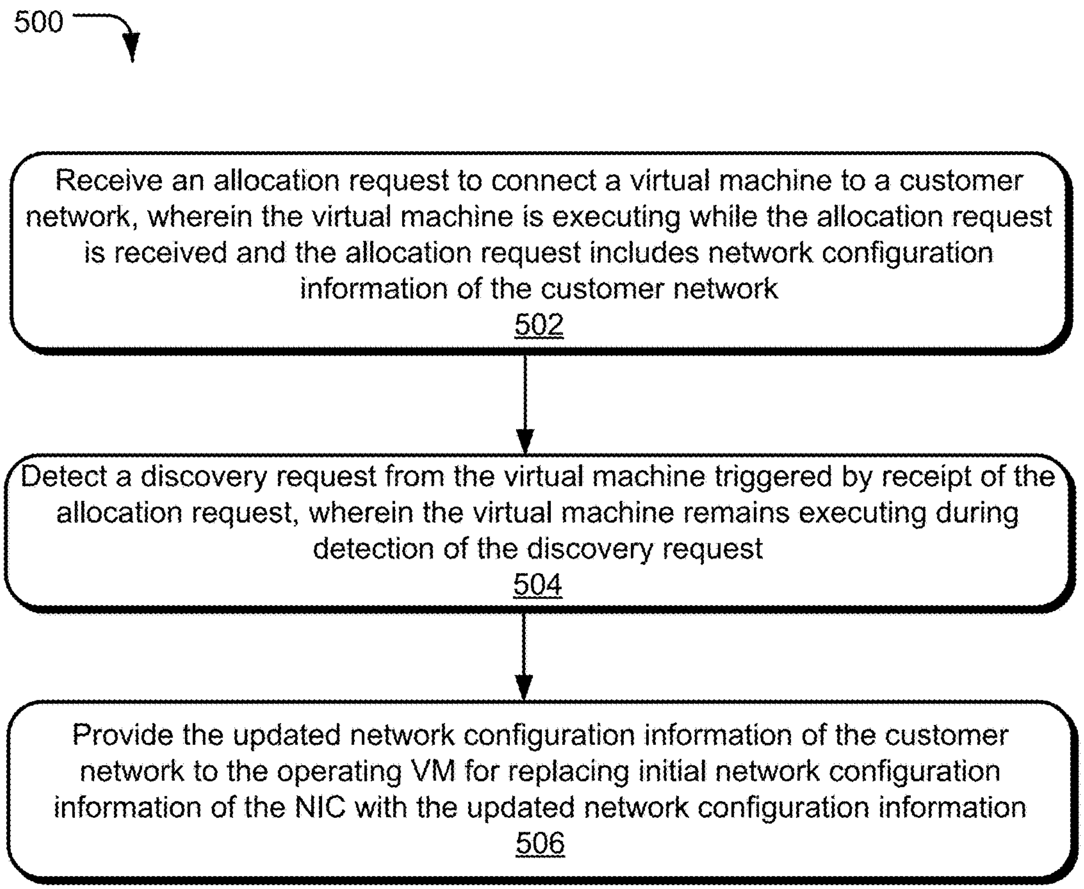
FIG. 5 illustrates example operations for modifying, by a cloud computing resource system, network connectivity of a VM from a first customer network to a second customer network via generating an event and responding to a DHCP request.

FIG. 5 illustrates example operations 500 for modifying, by a cloud computing resource system, network connectivity of a VM from a first customer network to a second customer network via generating an event and responding to a DHCP request. The example operations 500 include example operation 502, example operation 504, and operation 506. In some implementations, the example operations 500 are performed by a host operating system of a cloud resource computing system.

An example receiving operation 502 receives an allocation request to connect a virtual machine to a customer network, wherein the virtual machine is executing while the allocation request is received and the allocation request includes network configuration information of the customer network. For example, the allocation request is received from a provider system. The allocation request includes instructions to allocate the operating VM to the customer network. In some implementations, the operating VM is configured to communicate with another customer network prior to the issuance of the allocation request. In some implementations, the operating VM is configured to communicate with a network of the provider system prior to the issuance of the allocation request. The allocation request includes an IP address of the customer network.

An example detecting operation 504 detects a discovery request from the virtual machine triggered by receipt of the allocation request, wherein the virtual machine remains executing during the detection of the discovery request. In some implementations, the detecting operation 504 includes an issuing operation that issues an event indicating a change in network configuration information for a virtual network interface controller (VNIC) supporting the VM. The event indicates that the network connectivity of the operating VM has been reconfigured. The issuing operation may involve associating the IP address of the customer network with the operating VM and the event and storing the event and the IP address of the customer network. The VM (e.g., the GOS of the VM) detects the event. For example, the VM is subscribed to the event and detects the issuance of the event.

An example providing operation 506 provides the updated network configuration information of the customer network to the operating VM for replacing the initial network configuration information of the VNIC with the updated network configuration information. For example, the providing operation 506 provides, responsive to receiving a discovery request from the operating VM, the updated network configuration information to the operating VM. In some implementations, the discovery request is a DHCP request. Responsive to detecting the event, transmits a DHCP request to discover the IP address of the customer network. The VM communicates with a VNIC to reconfigure the network settings of the VNIC so that the VM can communicate with the customer network.

Figure 6:
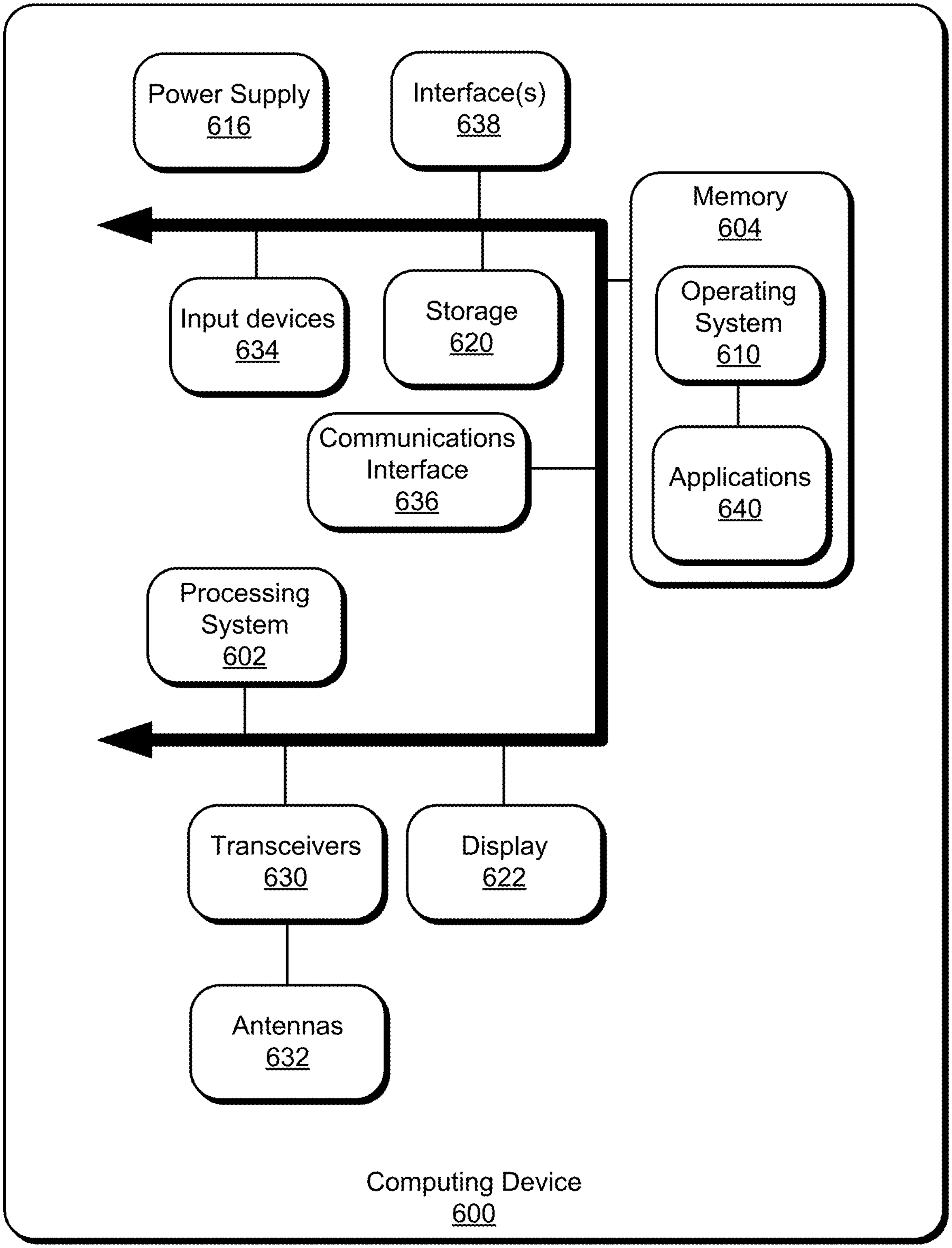
FIG. 6 illustrates an example computing device for use in implementing the described technology.

FIG. 6 illustrates an example computing device 600 for use in implementing the described technology. The computing device 600 may be a client computing device (such as a laptop computer, a desktop computer, or a tablet computer), a server/cloud computing device, an Internet-of-Things (IoT), any other type of computing device, or a combination of these options. The computing device 600 includes one or more hardware processor(s) 602 and a memory 604. The memory 604 generally includes both volatile memory (e.g., RAM) and nonvolatile memory (e.g., flash memory), although one or the other type of memory may be omitted. An operating system 610 resides in the memory 604 and is executed by the processor(s) 602. In some implementations, the computing device 600 includes and/or is communicatively coupled to storage 620.

In the example computing device 600, as shown in FIG. 6, one or more software modules, segments, and/or processors, such as applications 640, a cloud computing resource system, a HOS, a provider system, a VM allocator, customer networks, a service, VNICs, a control plane, a network manager, a resource provider, and other program code and modules are loaded into the operating system 610 on the memory 604 and/or the storage 620 and executed by the processor(s) 602. The storage 620 may store a data structure that associates generated events with corresponding VMs and customer network configuration information (e.g., including a customer network IP address) that enable a HOS (e.g., a vNet agent) to provide customer network configuration information responsive to receiving a DHCP request from the VM that detects the event, and other data and be local to the computing device 600 or may be remote and communicatively connected to the computing device 600. In particular, in one implementation, components of a system for classifying a dataset may be implemented entirely in hardware or in a combination of hardware circuitry and software.

The computing device 600 includes a power supply 616, which may include or be connected to one or more batteries or other power sources, and which provides power to other components of the computing device 600. The power supply 616 may also be connected to an external power source that overrides or recharges the built-in batteries or other power sources.

The computing device 600 may include one or more communication transceivers 630, which may be connected to one or more antenna(s) 632 to provide network connectivity (e.g., mobile phone network, Wi-Fi®, Bluetooth®) to one or more other servers, client devices, IoT devices, and other computing and communications devices. The computing device 600 may further include a communications interface 636 (such as a network adapter or an I/O port, which are types of communication devices). The computing device 600 may use the adapter and any other types of communication devices for establishing connections over a wide-area network (WAN) or local-area network (LAN). It should be appreciated that the network connections shown are exemplary and that other communications devices and means for establishing a communications link between the computing device 600 and other devices may be used.

The computing device 600 may include one or more input devices 634 such that a user may enter commands and information (e.g., a keyboard, trackpad, or mouse). These and other input devices may be coupled to the server by one or more interfaces 638, such as a serial port interface, parallel port, or universal serial bus (USB). The computing device 600 may further include a display 622, such as a touchscreen display.

The computing device 600 may include a variety of tangible processor-readable storage media and intangible processor-readable communication signals. Tangible processor-readable storage can be embodied by any available media that can be accessed by the computing device 600 and can include both volatile and nonvolatile storage media and removable and non-removable storage media. Tangible processor-readable storage media excludes intangible, transitory communications signals (such as signals per se) and includes volatile and nonvolatile, removable, and non-removable storage media implemented in any method, process, or technology for storage of information such as processor-readable instructions, data structures, program modules, or other data. Tangible processor-readable storage media includes but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method for modifying a network connectivity of a virtual machine, the method comprising: receiving an allocation request to connect the virtual machine to a customer network, wherein the virtual machine is executing while the allocation request is received and the allocation request includes network configuration information of the customer network; detecting a discovery request from the virtual machine triggered by receipt of the allocation request, wherein the virtual machine remains executing during detection of the discovery request; and updating, responsive to detecting the discovery request from the virtual machine, a virtual network interface controller of the virtual machine with the network configuration information of the customer network, wherein the virtual machine remains executing during updating of the network configuration information.

Clause 2. The method of clause 1, the virtual network interface controller including initial network configuration information including first internet protocol address information of an additional customer network separate from the customer network, the network configuration information including second internet protocol address information of the customer network, wherein updating the virtual network interface controller includes replacing the first internet protocol address information with the second internet protocol address information.

Clause 3. The method of clause 2, wherein the virtual machine ceases to communicate with the additional customer network and communicates with the customer network responsive to replacing the first internet protocol address information of the virtual network interface controller with the second internet protocol address information.

Clause 4. The method of clause 1, the virtual network interface controller including initial network configuration information including first internet protocol address information of a network of a provider system separate from the customer network, the network configuration information including second internet protocol address information of the customer network, the allocation request being received from the provider system, wherein updating the virtual network interface controller includes replacing the first internet protocol address information with the second internet protocol address information.

Clause 5. The method of clause 1, further comprising: at a time before receiving the allocation request, configuring the virtual machine to receive events indicating changes in the network configuration information.

Clause 6. The method of clause 1, wherein the virtual machine is supported by the virtual network interface controller and a supplementary virtual network interface controller, the supplementary virtual network interface controller including supplementary network configuration information of a network of a provider system.

Clause 7. The method of clause 1, the discovery request comprising a dynamic host configuration protocol request.

Clause 8. The method of clause 1, further comprising: issuing an allocation change event responsive to receipt of the allocation request, wherein the virtual machine remains executing during issuance of the allocation change event, the discovery request is detected responsive to issuing the allocation change event.

Clause 9. A computing system for modifying a network connectivity of a virtual machine operating on the computing system, the computing system comprising: one or more hardware processors; a communication interface executable by the one or more hardware processors and configured to receive an allocation request to connect the virtual machine to a customer network, wherein the virtual machine is executing while the allocation request is received and the allocation request includes network configuration information of the customer network; and a virtual network agent executable by the one or more hardware processors and configured to detecting a discovery request from the virtual machine triggered by receipt of the allocation request, wherein the virtual machine remains executing during detection of the discovery request, the virtual network agent further configured to update, responsive to detecting the discovery request from the virtual machine, a virtual network interface controller of the virtual machine with the network configuration information of the customer network, wherein the virtual machine remains executing during updating of the network configuration information.

Clause 10. The system of clause 9, further comprising an event generator executable by the one or more hardware processors and configured to issue an allocation change event responsive to receipt of the allocation request, wherein the virtual machine remains executing during issuance of the allocation change event, the discovery request is detected responsive to issuing the allocation change event.

Clause 11. The system of clause 9, the virtual network interface controller including initial network configuration information including first internet protocol address information of an additional customer network separate from the customer network, the network configuration information including second internet protocol address information of the customer network, wherein updating the virtual network interface controller includes replacing the first internet protocol address information with the second internet protocol address information.

Clause 12. The system of clause 11, wherein the virtual machine ceases to communicate with the additional customer network and communicates with the customer network responsive to replacing the first internet protocol address information of the virtual network interface controller with the second internet protocol address information.

Clause 13. The system of clause 9, the virtual network interface controller including initial network configuration information including first internet protocol address information of a network of a provider system separate from the customer network, the network configuration information including second internet protocol address information of the customer network, the allocation request being received from the provider system, wherein updating the virtual network interface controller includes replacing the first internet protocol address information with the second internet protocol address information.

Clause 14. The system of clause 9, the virtual network agent being further configured to configure, at a time before receiving the allocation request, the virtual machine to receive events indicating changes in the network configuration information.

Clause 15. The system of clause 9, the virtual network agent being further configured to issue an allocation change event responsive to receipt of the allocation request, wherein the virtual machine remains executing during issuance of the allocation change event, the discovery request is detected responsive to issuing the allocation change event.

Clause 16. The system of clause 9, the discovery request comprising a dynamic host configuration protocol (DHCP) request.

Clause 17. One or more tangible processor-readable storage media embodied with instructions for executing on one or more processors and circuits of a computing device a process for modifying a network connectivity of a virtual machine, the process comprising: receiving an allocation request to connect the virtual machine to a customer network, wherein the virtual machine is executing while the allocation request is received and the allocation request includes network configuration information of the customer network; issuing an allocation change event responsive to receipt of the allocation request, wherein the virtual machine remains executing during issuance of the allocation change event; detecting, responsive to issuing the allocation change event, a discovery request from the virtual machine triggered by receipt of the allocation request, wherein the virtual machine remains executing during detection of the discovery request; and updating, responsive to detecting the discovery request from the virtual machine, a virtual network interface controller of the virtual machine with the network configuration information of the customer network, wherein the virtual machine remains executing during updating of the network configuration information.

Clause 18. The one or more tangible processor-readable storage media of clause 17, the virtual network interface controller including initial network configuration information including first internet protocol address information of an additional customer network separate from the customer network, the network configuration information including second internet protocol address information of the customer network, wherein updating the virtual network interface controller includes replacing the first internet protocol address information with the second internet protocol address information.

Clause 19. The one or more tangible processor-readable storage media of clause 18, wherein the virtual machine ceases to communicate with the additional customer network and communicates with the customer network responsive to replacing the first internet protocol address information of the virtual network interface controller with the second internet protocol address information.

Clause 20. The one or more tangible processor-readable storage media of clause 17, the virtual network interface controller including initial network configuration information including first internet protocol address information of a network of a provider system separate from the customer network, the network configuration information including second internet protocol address information of the customer network, the allocation request being received from the provider system, wherein updating the virtual network interface controller includes replacing the first internet protocol address information with the second internet protocol address information.

Clause 21. A computing system for modifying a network connectivity of a virtual machine, the computing system comprising: means for receiving an allocation request to connect the virtual machine to a customer network, wherein the virtual machine is executing while the allocation request is received and the allocation request includes network configuration information of the customer network; means for detecting a discovery request from the virtual machine triggered by receipt of the allocation request, wherein the virtual machine remains executing during detection of the discovery request; and means for updating, responsive to detecting the discovery request from the virtual machine, a virtual network interface controller of the virtual machine with the network configuration information of the customer network, wherein the virtual machine remains executing during updating of the network configuration information.

Clause 22. The system of clause 21, the virtual network interface controller including initial network configuration information including first internet protocol address information of an additional customer network separate from the customer network, the network configuration information including second internet protocol address information of the customer network, wherein the means for updating the virtual network interface controller includes means for replacing the first internet protocol address information with the second internet protocol address information.

Clause 23. The system of clause 22, wherein the virtual machine ceases to communicate with the additional customer network and communicates with the customer network responsive to replacing the first internet protocol address information of the virtual network interface controller with the second internet protocol address information.

Clause 24. The system of clause 21, the virtual network interface controller including initial network configuration information including first internet protocol address information of a network of a provider system separate from the customer network, the network configuration information including second internet protocol address information of the customer network, the allocation request being received from the provider system, wherein the means for updating the virtual network interface controller includes means for replacing the first internet protocol address information with the second internet protocol address information.

Clause 25. The system of clause 21, further comprising means for configuring, at a time before receiving the allocation request, the virtual machine to receive events indicating changes in the network configuration information.

Clause 26. The system of clause 21, wherein the virtual machine is supported by the virtual network interface controller and a supplementary virtual network interface controller, the supplementary virtual network interface controller including supplementary network configuration information of a network of a provider system.

Clause 27. The system of clause 21, the discovery request comprising a dynamic host configuration protocol request.

Clause 28. The system of clause 21, further comprising means for issuing an allocation change event responsive to receipt of the allocation request, wherein the virtual machine remains executing during issuance of the allocation change event, and the discovery request is detected responsive to issuing the allocation change event.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method for modifying a network connectivity of a virtual machine, the method comprising:

receiving an allocation request to connect the virtual machine to a second customer network, wherein a virtual network interface controller of the virtual machine is configured with first network configuration information of a first customer network distinct from the second customer network, the virtual machine is executing on the first customer network while the allocation request is received, and the allocation request includes second network configuration information of the second customer network;

detecting a discovery request from the virtual machine triggered by receipt of the allocation request, wherein the virtual machine remains executing on the first customer network during detection of the discovery request; and updating, responsive to detecting the discovery request from the virtual machine, the virtual network interface controller of the virtual machine to replace the first network configuration information of the first customer network with the second network configuration information of the second customer network, wherein the virtual machine remains executing on the first customer network until the virtual network interface controller is updated and executes on the second customer network after the virtual network interface controller is updated.

2. The method of claim 1, the first network configuration information including first internet protocol address information of the first customer network and the second network configuration information including second internet protocol address information of the second customer network, wherein updating the virtual network interface controller includes replacing the first internet protocol address information with the second internet protocol address information.

3. The method of claim 2, wherein the virtual machine ceases to communicate with the first customer network and communicates with the second customer network responsive to replacing the first internet protocol address information of the virtual network interface controller with the second internet protocol address information.

4. The method of claim 1, the first network configuration information including first internet protocol address information of the first customer network, the first customer network being implemented within a cloud resource system controlled by a provider system and separate from the second customer network, the second network configuration information including second internet protocol address information, the allocation request being received from the provider system, wherein updating the virtual network interface controller includes replacing the first internet protocol address information with the second internet protocol address information.

5. The method of claim 1, further comprising:

at a time before receiving the allocation request, configuring the virtual machine to receive events indicating changes in the first network configuration information.

6. The method of claim 1, wherein the virtual machine is supported by the virtual network interface controller and a supplementary virtual network interface controller, the supplementary virtual network interface controller including supplementary network configuration information of a network of a provider system.

7. The method of claim 1, the discovery request comprising a dynamic host configuration protocol request.

8. The method of claim 1, further comprising:

issuing an allocation change event responsive to receipt of the allocation request, wherein the virtual machine remains executing on the first customer network during issuance of the allocation change event, the discovery request is detected responsive to issuing the allocation change event.

9. A computing system for modifying a network connectivity of a virtual machine operating on the computing system, the computing system comprising:

one or more hardware processors;

a communication interface executable by the one or more hardware processors and configured to receive an allocation request to connect the virtual machine to a second customer network, wherein a virtual network interface controller of the virtual machine is configured with first network configuration information of a first customer network distinct from the second customer network, the virtual machine is executing on a first customer network while the allocation request is received, and the allocation request includes second network configuration information of the second customer network; and a virtual network agent executable by the one or more hardware processors and configured to detect a discovery request from the virtual machine triggered by receipt of the allocation request, wherein the virtual machine remains executing on the first customer network during detection of the discovery request, the virtual network agent further configured to update, responsive to detecting the discovery request from the virtual machine, a virtual network interface controller of the virtual machine to replace first network configuration information of the first customer network with the second network configuration information of the second customer network, wherein the virtual machine remains executing on the first customer network until the virtual network interface controller is updated and executes on the second customer network after the virtual network interface controller is updated.

10. The computing system of claim 9, further comprising an event generator executable by the one or more hardware processors and configured to issue an allocation change event responsive to receipt of the allocation request, wherein the virtual machine remains executing on the first customer network during issuance of the allocation change event, the discovery request is detected responsive to issuing the allocation change event.

11. The computing system of claim 9, the first network configuration information including first internet protocol address information of the first customer network, the second network configuration information including second internet protocol address information of the second customer network, wherein updating the virtual network interface controller includes replacing the first internet protocol address information with the second internet protocol address information.

12. The computing system of claim 11, wherein the virtual machine ceases to communicate with the first customer network and communicates with the second customer network responsive to replacing the first internet protocol address information of the virtual network interface controller with the second internet protocol address information.

13. The computing system of claim 9, the first network configuration information including first internet protocol address information of the first customer network, the first customer network being implemented within a cloud resource system controlled by a network of a provider system and separate from the second customer network, the second network configuration information including second internet protocol address information of the second customer network, the allocation request being received from the provider system, wherein updating the virtual network interface controller includes replacing the first internet protocol address information with the second internet protocol address information.

14. The computing system of claim 9, the virtual network agent being further configured to configure, at a time before receiving the allocation request, the virtual machine to receive events indicating changes in the first network configuration information.

15. The computing system of claim 9, the virtual network agent being further configured to issue an allocation change event responsive to receipt of the allocation request, wherein the virtual machine remains executing on the first customer network during issuance of the allocation change event, the discovery request is detected responsive to issuing the allocation change event.

16. The computing system of claim 9, the discovery request comprising a dynamic host configuration protocol (DHCP) request.

17. One or more tangible processor-readable storage media embodied with instructions for executing on one or more processors and circuits of a computing device a process for modifying a network connectivity of a virtual machine, the process comprising:

receiving an allocation request to connect the virtual machine to a second customer network, wherein a virtual network interface controller of the virtual machine is configured with first network configuration information of a first customer network distinct from the second customer network, the virtual machine is executing on a first customer network while the allocation request is received, and the allocation request includes second network configuration information of the second customer network;

issuing an allocation change event responsive to receipt of the allocation request, wherein the virtual machine remains executing on the first customer network during issuance of the allocation change event;

detecting, responsive to issuing the allocation change event, a discovery request from the virtual machine triggered by receipt of the allocation request, wherein the virtual machine remains executing on the first customer network during detection of the discovery request; and updating, responsive to detecting the discovery request from the virtual machine, a virtual network interface controller of the virtual machine to replace first network configuration information of the first customer network with the second network configuration information of the second customer network, wherein the virtual machine remains executing first customer network until the virtual network interface controller is updated and executes on the second customer network after the virtual network interface controller is updated.

18. The one or more tangible processor-readable storage media of claim 17, the first network configuration information including first internet protocol address information of the first customer network, the second network configuration information including second internet protocol address information of the second customer network, wherein updating the virtual network interface controller includes replacing the first internet protocol address information with the second internet protocol address information.

19. The one or more tangible processor-readable storage media of claim 18, wherein the virtual machine ceases to communicate with the first customer network and communicates with the second customer network responsive to replacing the first internet protocol address information of the virtual network interface controller with the second internet protocol address information.

20. The one or more tangible processor-readable storage media of claim 17, the first network configuration information including first internet protocol address information of the first customer network, the first customer network being implemented within a cloud resource system controlled by a provider system separate from the second customer network, the second network configuration information including second internet protocol address information of the second customer network, the allocation request being received from the provider system, wherein updating the virtual network interface controller includes replacing the first internet protocol address information with the second internet protocol address information.

* * * * *